United States Patent
Chavan et al.

(10) Patent No.: US 12,037,534 B2
(45) Date of Patent: Jul. 16, 2024

(54) RECLAIMED CARBON BLACK DRILLING FLUID ADDITIVE

(71) Applicant: Halliburton Energy Services, Inc., Houston, TX (US)

(72) Inventors: Sandeep Vasant Chavan, Mumbai (IN); Vilas Ramtenki, Pune (IN); Siddharth Roy, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/558,039

(22) Filed: Dec. 21, 2021

(65) Prior Publication Data

US 2023/0193107 A1 Jun. 22, 2023

(51) Int. Cl.
*C09K 8/12* (2006.01)

(52) U.S. Cl.
CPC ..................................... *C09K 8/12* (2013.01)

(58) Field of Classification Search
None
See application file for complete search history.

(56) References Cited

U.S. PATENT DOCUMENTS

| | | |
|---|---|---|
| 3,412,792 A | 11/1968 | Parker et al. |
| 5,114,597 A | 5/1992 | Rayborn et al. |
| 5,826,669 A | 10/1998 | Zaleski et al. |
| 6,239,183 B1 | 5/2001 | Farmer et al. |
| 6,465,397 B1 | 10/2002 | Patterson |
| 8,822,386 B2 | 9/2014 | Quintero et al. |
| 8,835,363 B2 | 9/2014 | Amanullah et al. |
| 10,273,397 B2 | 4/2019 | Zha et al. |
| 2010/0249353 A1* | 9/2010 | MacIntosh ............. C01B 32/05 423/449.1 |
| 2010/0300759 A1 | 12/2010 | Passade-Boupat et al. |
| 2011/0059871 A1 | 3/2011 | Tour et al. |
| 2011/0183874 A1 | 7/2011 | Ghassemzadeh |
| 2012/0138299 A1 | 6/2012 | Joseph et al. |
| 2013/0065798 A1 | 3/2013 | Amanullah et al. |
| 2013/0112409 A1 | 5/2013 | Baleno et al. |
| 2014/0349894 A1 | 11/2014 | Quintero et al. |
| 2015/0210912 A1 | 7/2015 | Amanullah et al. |
| 2016/0254543 A1* | 9/2016 | Naskar ................ H01M 10/054 429/231.8 |
| 2016/0326423 A1* | 11/2016 | Yang ..................... C09K 8/035 |

(Continued)

FOREIGN PATENT DOCUMENTS

| | | |
|---|---|---|
| WO | 2000026321 | 5/2000 |
| WO | 2015148793 | 10/2015 |

(Continued)

OTHER PUBLICATIONS

International Search Report and Written Opinion for Application No. PCT/US2022/037688, dated Nov. 4, 2022.

(Continued)

*Primary Examiner* — Shane Fang
(74) *Attorney, Agent, or Firm* — Thomas Rooney; C. Tumey Law Group PLLC

(57) ABSTRACT

A method may include: circulating a drilling fluid in a wellbore, wherein the drilling fluid includes: an aqueous phase; and a reclaimed carbon black additive; and drilling into a subterranean formation to extend the wellbore while the drilling fluid is circulated therein.

11 Claims, 1 Drawing Sheet

(56) References Cited

U.S. PATENT DOCUMENTS

2017/0096593 A1    4/2017  Step et al.
2017/0321102 A1*  11/2017  Whitfill .................. C09K 8/032
2019/0360326 A1*  11/2019  Deville ................. E21B 49/005
2022/0145161 A1    5/2022  Lane

FOREIGN PATENT DOCUMENTS

WO    2015148793 A1   10/2015
WO    2016/053329      4/2016

OTHER PUBLICATIONS

Samavati, Rahelah—The Thermal Stability and Fluid Loss Control Enhancement of Fufu—WBM by Addition of Carbon Black and Gilsonite, in HTHP Circumstances—Jun. 2015.
"Assessment of Recovered Carbon Black Obtained by Waste Tires Steam Water Thermolysis: An Industrial Application" Moulin et al. Nov. 7, 2018.
GB Office Action for GB Patent Application No. GB2211826.9 dated Jan. 23, 2023.
Office Action for Paris Convention Patent Application No. 122440648 in Saudi Arabia dated May 30, 2023.

\* cited by examiner

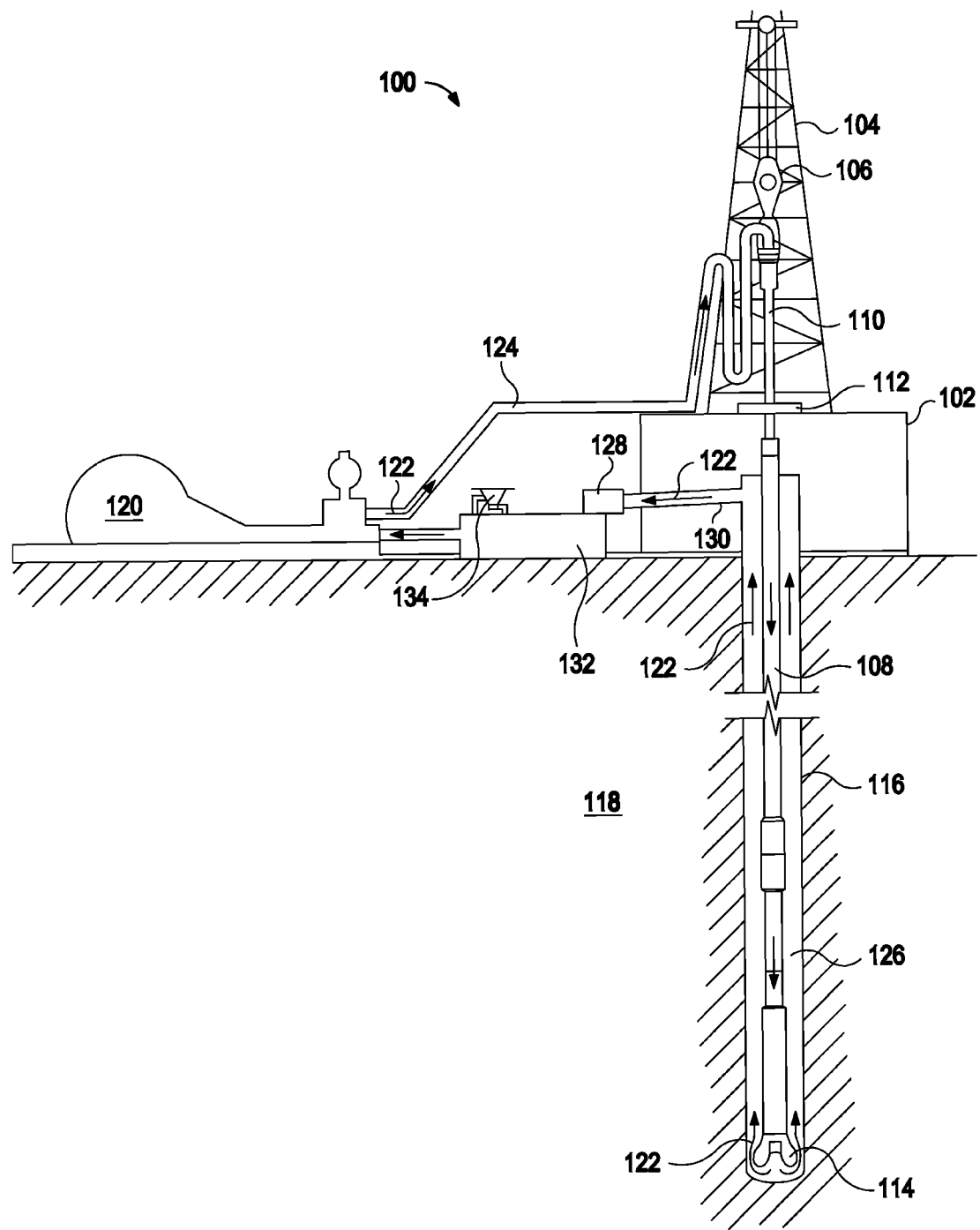

RECLAIMED CARBON BLACK DRILLING FLUID ADDITIVE

BACKGROUND

A drilling fluid is a specially designed fluid that is circulated through a wellbore as the wellbore is being drilled to facilitate the drilling operation. Drilling fluids may also be referred to as a "drilling mud." The various functions of a drilling fluid may include removing drill cuttings from the wellbore, cooling and lubricating the drill bit, aiding in support of the drill pipe and drill bit and/or providing a hydrostatic head to maintain the integrity of the wellbore walls, and prevent well blowouts. Specific drilling fluids, which can be oil-based or aqueous-based, may be selected to optimize a drilling operation in accordance with the characteristics of a particular geological formation.

Drilling fluids may include a number of different additives which improve the physical properties of the drilling fluid. To minimize the loss of drilling fluids into the formation, components in the drilling fluid, such as clays, fillers and lost circulation materials, are used to restrict flow of the drilling fluids into the formation and to form a filter cake at the wellbore wall. It is common for a drilling fluid to include a weighting material, or weighting agent, to increase the density of the drilling fluid. Drilling fluids often contain filtration control additives to inhibit or prevent loss of the drilling fluid into a permeable formation.

One of the major challenges in water-based drilling fluids is to achieve appropriate rheology at low shear rates (also known as low end rheology) while at the same time maintaining a specified yield point. The low-end rheology of drilling fluids is important as carrying capacity of the drilling fluid to suspend weighting agent and drilled cuttings may decrease as shear is decreased. Low-end rheology is also a factor when designing to minimize torque and drag while drilling and to lower the equivalent circulating density by being able to clean the cuttings out of the wellbore. Viscosifiers may be added to a drilling fluid to improve low-end rheology. However, viscosifiers will also change other drilling fluid properties such as increasing yield point which may render the drilling fluid unsuitable for drilling.

BRIEF DESCRIPTION OF THE DRAWINGS

For a detailed description of the preferred embodiments of the invention, reference will now be made to the accompanying drawings in which:

The FIG. 1 is a schematic diagram of an example drilling assembly.

DETAILED DESCRIPTION

The present disclosure relates generally to wellbore drilling operations. More particularly, the present invention relates to a method of drilling using a drilling fluid comprising a reclaimed carbon black drilling fluid additive. The disclosed reclaimed carbon black drilling fluid additive improves low-end rheology of the drilling fluid without significantly increasing the yield point of the drilling fluid. In some embodiments, the drilling fluid comprising the reclaimed carbon black drilling fluid additive may be used without additional viscosifiers. Drilling fluids may include oil-based muds also referred to as invert emulsions and oil external emulsions and water-based muds also referred to as direct emulsions and water external emulsions. Drilling fluids may comprise an oleaginous fluid, an aqueous fluid, and the carbon black drilling fluid additive.

Reclaimed carbon black is compositionally distinct from virgin carbon black as reclaimed carbon black is sourced from a pyrolysis process whereas virgin carbon black is sourced from incomplete combustion of heavy petroleum products. Virgin carbon black is often recovered in the form of fine black powder produced by the incomplete combustion of heavy petroleum products such as FCC tar, coal tar, or ethylene cracking tar. Virgin carbon black contains only trace amounts of impurities and carbon content is close to 100%. Virgin carbon black contains nearly 100% paracrystalline carbon with short and medium order crystallinity in lattice. In contrast, reclaimed carbon black is produced from pyrolysis of carbon-containing materials such as tires and rubbers, for example. The composition of reclaimed carbon black is dependent upon the feedstock and process used to produce the reclaimed carbon black. Reclaimed carbon black typically contains about 15-20% ash by weight, about 0-3% volatile hydrocarbons by weight, about 3-22% by weight amorphous carbon residue, and the remainder is paracrystalline carbon. Ash is typically composed of inorganic compounds that are used in the production of rubber and tires and may include silica compounds and zinc components such as $SiO_2$, ZnO, and ZnS, for example. The volatile hydrocarbons and amorphous carbon residue may be produced from depolymerized bound rubber fragments. The drilling fluids of the present disclosure may include the reclaimed carbon black additive in any suitable amount, including from about 0.1 ppb (pounds per barrel) (0.29 g/L) to about 10 ppb (28.50 g/L). Alternatively, from about 0.1 ppb (0.29 g/L) to about 1 ppb (2.85 g/L), about 1 ppb (2.85 g/L) to about 3 ppb (8.55 g/L), about 3 ppb (8.55 g/L) to about 5 ppb (14.3 g/L), about 5 ppb (14.3 g/L) to about 8 ppb (22.8 g/L), about 8 ppb (22.8 g/L) to about 10 ppb (28.5 g/L), or any ranges therebetween.

Virgin carbon black sourced from incomplete combustion has some disadvantages in use in drilling fluids. Virgin carbon black is characterized by having surface functional groups such as phenolic and carboxylic groups, for example. These functional groups render the carbon particles as hydrophobic and hence require pre-treatment via a surfactant before being dispersed in a typical water-based drilling fluid. Reclaimed carbon black used in the present application may be sourced from any suitable source such as from tires as part of pyrolysis process for furnace oil recovery. Reclaimed carbon black from pyrolysis has a lower concentration of functional groups on the surface and therefore reclaimed carbon black is more readily dispersed in water-based mud without any pretreatment.

The drilling fluid of the present disclosure may be useful in the drilling, completion and working over of subterranean oil and gas wells. Such drilling and completions may be especially useful in drilling horizontal wells into hydrocarbon bearing formations. Any of a variety of suitable techniques may be used for preparation of the drilling fluid, including those normally used, to prepare drilling fluids such as direct and invert emulsions for drilling fluids. In one example, a desired quantity of oleaginous fluid such as a base oil and a suitable amount of emulsifier are mixed together and the remaining components (e.g., the non-oleaginous fluid) are added sequentially with continuous mixing. In some embodiments, an oilfield emulsion in the form of an invert emulsion may be formed by vigorously agitating, mixing or shearing the oleaginous fluid, non-oleaginous fluid, and emulsifier.

Examples of drilling fluids may include oil-based, synthetic-based, and water-based emulsions in the form of invert or direct emulsions. An example of a suitable oilfield emulsion may be in the form of an invert emulsion that comprises an oleaginous continuous phase and a non-oleaginous discontinuous phase. Another example of a suitable oilfield emulsion may be in the form of a direct emulsion that comprises a non-oleaginous continuous phase and an oleaginous discontinuous phase. Whether invert or direct emulsion, the ratio of the continuous phase to discontinuous phase in the oilfield emulsion, for example, may be in the range of 20:80 v/v CDR (continuous phase to discontinuous phase ratio) to 99:1 v/v CDR or, alternatively 20:80 v/v CDR to 90:10 v/v CDR or, alternatively 20:80 v/v CDR to 50:50 v/v CDR. The continuous phase (e.g., non-oleaginous phase) can be any suitable vol % of the oilfield emulsion. For example, the continuous phase can be about 1 vol % to about 99 vol % of the oilfield emulsion, about 10 vol % to about 50 vol %, or about 1 vol % or less, or about 2 vol %, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 vol % or more of the oilfield emulsion.

The drilling fluid may include an oleaginous fluid in the oleaginous phase, which may be either the continuous or discontinuous phase, depending on whether the oilfield emulsion is an invert or direct emulsion. Any suitable oleaginous fluid or base oil may be used in the drilling fluid, including, but not limited to, a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil includes diesel oil. The saturated hydrocarbon can be an alkane or paraffin. For example, the saturated hydrocarbon may include an isoalkane, a linear alkane, or a cyclic alkane. Examples of suitable saturated hydrocarbons may include a combination of an isoalkane and an n-alkane or a mineral oil blend that includes alkanes and cyclic alkanes. The unsaturated hydrocarbon may include an alkene, alkyne, or aromatic. The alkene may include an isoalkene, linear alkene, or cyclic alkene. The linear alkene may include a linear alpha olefin or an internal olefin.

In invert emulsion embodiments, the concentration of the oleaginous fluid should be sufficient so that an invert emulsion forms and may be less than about 99% by volume of the invert emulsion. In some embodiments, the oleaginous fluid is present in an amount of about 30% to about 99% by volume. In some embodiments, the oleaginous fluid is present in an amount of about 40% to about 98% by volume. In some embodiments, the oleaginous fluid is present in an amount of about 50% to about 97% by volume. In some embodiments, the oleaginous fluid is present in an amount of about 70% to about 90% by volume. The oleaginous fluid, in some embodiments, may include at least 5% by volume of a material selected from the group including ethers, acetals, dialkylcarbonates, hydrocarbons, and combinations thereof.

In direct emulsion embodiments, the oleaginous fluid may be in any suitable amount, for example, an amount of less that about 70% by volume of the oilfield emulsion, e.g., from about 1% to about 70% by volume. In some embodiments, the oleaginous fluid is present in an amount of from about 2% to about 60% by volume. In some embodiments, the oleaginous fluid is present in an amount of from about 3% to about 50% by volume. In some embodiments, the oleaginous fluid is present in an amount of from about 10% to about 30% by volume.

The drilling fluid may further include a non-oleaginous fluid in the non-oleaginous phase, which may be either the continuous or discontinuous phase, depending on whether the oilfield emulsion is an invert or direct emulsion. In some embodiments, the non-oleaginous fluid is an aqueous fluid, such as freshwater, seawater, or brines containing organic and/or inorganic dissolved salts such as group I and group II salts. In invert emulsion embodiments, the amount of the non-oleaginous fluid is typically less than the theoretical limit needed for forming an invert emulsion. For example, the non-oleaginous fluid may be present in an amount of less that about 70% by volume of the oilfield emulsion, e.g., from about 1% to about 70% by volume. In some embodiments, the non-oleaginous fluid is present in an amount of from about 2% to about 60% by volume. In some embodiments, the non-oleaginous fluid is present in an amount of from about 3% to about 50% by volume. In some embodiments, the non-oleaginous fluid is present in an amount of from about 10% to about 30% by volume. In direct emulsion embodiments, the concentration of the non-oleaginous fluid should be sufficient so that a direct emulsion forms and may be less than about 99% by volume of the direct emulsion. In some embodiments, the non-oleaginous fluid is present in an amount of about 30% to about 99% by volume. In some embodiments, the non-oleaginous fluid is present in an amount of about 40% to about 98% by volume. In some embodiments, the non-oleaginous fluid is present in an amount of about 50% to about 97% by volume. In some embodiments, the non-oleaginous fluid is present in an amount of about 70% to about 90% by volume.

The drilling fluid may include water-based mud. Water-based muds may include an aqueous fluid, such as freshwater, seawater, or brines containing organic and/or inorganic dissolved salts such as group I and group II salts. In water-based drilling muds, the aqueous fluid may include the majority of the bulk fluid, such as 90 vol. % or more. Water-based muds may further include clays, viscosifiers, and other drilling fluid additives described herein.

The drilling fluid of the present disclosure may be characterized in terms of various properties, for example, plastic viscosity. The drilling fluid may have any suitable properties such as yield point, 10-second gel strength, and 10-minute gel strength as determined by API Recommended Practice 13B-2, Recommended Practice for Field Testing of Oil-based Drilling Fluids, Fifth Edition, American Petroleum Institute, August 2014. In some embodiments, the drilling fluid may have a plastic viscosity in the range of from about 10 to about 160 centipoise (cP). In some embodiments, the drilling fluid may have a plastic viscosity in the range of from about 15 to about 75 cP. In some embodiments, the drilling fluid may have a plastic viscosity in the range of from about 20 to about 50 cP. The drilling fluid may also be characterized in terms of yield point (as measured by API test 13B-2). In some embodiments, the drilling fluid may have a yield point in the range of from about 2 to about 65 lb/100 ft$^2$ (about 10 to about 311 kPA). In some embodiments, the drilling fluid have a yield point in the range of from about 5 to about 40 lb/100 ft$^2$ (about 24 kPA to about 192 kPA). In some embodiments, the drilling fluid may have a yield point in the range of from about 8 to about 30 lb/100 ft$^2$ (about 38 to about 144 kPA). In some embodiments, the drilling fluid may have a yield point in the range of from about 10 to about 25 lb/100 ft$^2$ (about 48 to 120 kPA). The drilling fluid may also be characterized in terms of 10-second gel strength (as measured by API test 13B-2). In some embodiments, the drilling fluid may have a 10-second gel strength in the range of from about 3 to about 50 lb/100 ft$^2$ (about 14 to about 239 kPa). In some embodiments, the drilling fluid may have a 10-second gel strength in the range of from about 5 to about 30 lb/100 ft$^2$ (about 24 to 144 kPa). In some embodiments, the drilling fluid may have a 10-second gel strength in the range of from about 7 to about 20 lb/100 ft$^2$ (about 34 to about 96 kPa). The drilling fluid may also be characterized in terms of 10-minute gel strength (as measured by API test 13B-2). In some embodiments, drilling fluids may have a 10-minute gel strength in the range of from about 3 to about 65 lb/100 ft$^2$ (about 14 to about 311 kPa). In some embodiments, the drilling fluid may have a 10-minute gel strength in the range of from about 5 to about 40 lb/100 ft$^2$ (about 24 to about 192 kPa). In some embodiment, the drilling fluid may have a 10-minute gel strength in the range of from about 7 to about 30 lb/100 ft$^2$ (about 34 to about 144 kPa).

The drilling fluid may have any suitable rheology as determined by API Recommended Practice 13B-2, Recommended Practice for Field Testing of Oil-based Drilling Fluids, Fifth Edition, American Petroleum Institute, August 2014. For example, the drilling fluid may be tested at different shear rates, typically at 600 RPM, 300 RPM, 200 RPM, 100 RPM, 6 RPM, and 3 RPM, in accordance with API Recommended Practice 13B-2. As discussed above, the reclaimed carbon black may provide advantageous properties to drilling fluids especially at low shear conditions of 3 RPM and 6 RPM. Rheology is typically reported in inverse seconds. For example, without limitation, the drilling fluid may have a measured rheology at 3 RPM of between about 5 (s$^{-1}$) to about 20 (s$^{-1}$). Alternatively, the drilling fluid may have a measured rheology at 3 RPM of between about 5 (s$^{-1}$) to about 10 (s$^{-1}$), about 10 (s$^{-1}$) to about 15 (s$^{-1}$), about 15 (s$^{-1}$) to about 20 (s$^{-1}$), or any ranges therebetween. Without limitation, the drilling fluid may have a measured rheology at 6 RPM of between about 5 (s$^{-1}$) to about 25 (s$^{-1}$). Alternatively, the drilling fluid may have a measured rheology at 3 RPM of between about 5 (s$^{-1}$) to about 10 (s$^{-1}$), about 10 (s$^{-1}$) to about 15 (s$^{-1}$), about 15 (s$^{-1}$) to about 20 (s$^{-1}$), about 10 (s$^{-1}$) to about 25 (s$^{-1}$) or any ranges therebetween.

The rheological and fluid loss properties of the drilling fluid may be determined by obtaining a variety of different measurements. In an embodiment, the drilling fluid may have a gel strength. Gel strength may be measured at any suitable time interval. In an embodiment, a 10-second gel strength may be determined. Suitable 10-second gel strengths may include, but are not limited to, about 3 lb/100 ft$^2$ (15 kg/100 m$^2$) to about 25 lb/100 ft$^2$ (122 kg/100 m$^2$) about 5 lb/100 ft$^2$ (24 kg/100 m$^2$) to about 20 lb/100 ft$^2$ (98 kg/100 m$^2$), or any ranges there between. As used herein, the 10-second gel strength is determined by stirring a sample of the drill-in fluid for 10 seconds at 600 rpm on a FANN® 35 rheometer. In an embodiment, the 10-minute gel strength of the drill-in fluid may be determined. Suitable 10-minute gel strengths may include, but are not limited to, about 3 lb/100 ft$^2$ (15 kg/100 m$^2$) to about 50 lb/100 ft$^2$ (244 kg/100 m$^2$) or about 3 lb/100 ft$^2$ (15 kg/100 m$^2$) to about 35 lb/100 ft$^2$ (170 kg/100 m$^2$), or any ranges therebetween. The 10-second gel strength and 10-minute gel strength of a drilling fluid should be determined according to API Recommended Practice 13B-2, Recommended Practice for Field Testing of Oil-based Drilling Fluids, Fifth Edition, American Petroleum Institute, August 2014.

Drilling fluids may have any suitable yield point. The yield point of a drilling fluid indicates the point on a stress-strain curve which indicates the limit of elastic behavior and the beginning of plastic behavior. Yield point as used herein is defined as the stress at which the drilling fluid may begin to deform plastically. The drilling fluid may have any suitable yield point, including but not limited to, about 5 lb/100 ft$^2$ (24 kg/100 m$^2$) to about 50 lb/100 ft$^2$ (244 kg/100 m$^2$), or about 5 lb/100 ft$^2$ (24 kg/100 m$^2$) to about 35 lb/100 ft$^2$ (170 kg/100 m$^2$), or any range therein.

Drilling fluids may have any suitable plastic viscosity. As used herein, "plastic viscosity" is defined as the resistance to the flow of a fluid. It may be caused by the mechanical friction within the drill-in fluid due to interaction between solids, the liquids and the deformation of liquid that is under shear stress. The drill-in fluid may have any suitable plastic viscosity, including but not limited to, about 10 cP to about 50 cP, or about 10 cP to about 20 cP, or about 20 cP to about 30 cP, or about 30 cP to about 40 cP, or about 40 cP to about 50 cP, or any range therein.

Drilling fluids may have any suitable density including from a density of about 7 pounds per gallon ("lb/gal") (840 kg/m$^3$) or greater. Alternatively, suitable drill-in fluids may have a density at a point in range of from about 7 pounds per gallon ("lb/gal") (840 kg/m$^3$) to about 20 lb/gal (2400 kg/m$^3$). Optionally, suitable drill-in fluids may have a density at a point in range of from about 8 lb/gal (960 kg/m$^3$) to about 12 lb/gal (1440 kg/m$^3$). Suitable drill-in fluids may be in the form of an invert emulsion including an internal aqueous phase and an external oil phase. The invert emulsion may have any suitable internal aqueous phase to external oil phase ratio, including but not limited to, about 40:80 to about 99:1 or about 50:50 to about 99:1.

The drilling fluids of the present disclosure may be prepared using any suitable method and/or equipment (e.g., blenders, mixers, stirrers, etc.). The drilling fluids may be prepared at least in part at a well site or at an offsite location. In certain embodiments, the additives of the present disclosure and/or other components of the drilling fluids may be metered directly into a base oil with shearing to form an oilfield emulsion. In certain embodiments, the base oil may be mixed with the additives of the present disclosure and/or other components of the oilfield at a well site where the operation or treatment is conducted, either by batch mixing or continuous ("on-the-fly") mixing. In other embodiments, the oilfield emulsions of the present disclosure may be prepared, either in whole or in part, at an offsite location and transported to the site where the treatment or operation is conducted.

The drilling fluid may further include components such as viscosifiers, weighting agents, surfactants, fluid loss control additives, corrosion inhibitors, scale inhibitors, clay control agents, biocides, and bridging agents, among others. Some examples of viscosifiers include, without limitation, gums such as guar, xanthan, and carboxymethyl cellulose, for example as well as synthetic viscosifiers such as polymers formed from monomers selected from 2-acrylamido-2-methylpropane sulfonic acid and vinyl pyrrolidinone; and crosslinkers of pentaerythritol allyl ether and methylenebisacrylamide, for example. An emulsifier may be included in the drilling fluid to promoting the formation and stabilization of the drilling fluid. Accordingly, by inclusion of the emulsifier, a drilling fluid that an oleaginous phase and a non-oleaginous phase may be prepared. The amount of the emulsifier present in the drilling should be sufficient to form a stable emulsion that is capable of remaining substantially emulsified, for example greater than 90% emulsified) at ambient conditions for more than about 1 minute after the halting of the agitation or shearing motion that forms the drilling fluid. The concentration of the emulsifier may vary depending on the particular components in the drilling fluid. In some embodiments, the emulsifier is present in the drilling fluid in an amount of about 10% by volume of the drilling fluid or less. In some embodiments, the emulsifier is present in an amount of about 0.1% to about 10.0% by volume. In some embodiments, the breakable emulsifier is present in an amount of about 0.1% to about 5.0% by volume. In some embodiment, the breakable emulsifier is present in an amount of about 1% to 5.0% by volume.

The hydrophilic-lipophilic balance ("HLB") of an emulsifying surfactant is a measure of the degree to which it is hydrophilic or lipophilic, determined by calculating a value based on the chemical groups of the molecule. This method is also referred to as the Davies HLB value. The advantage of this method is that it takes into account the effect of stronger and weaker hydrophilic groups. The method works as follows: $HLB=7+m*Hh-n*Hl$ where m is the number of hydrophilic groups in the molecule, Hh is the respective group HLB value of the hydrophilic groups, n is the number of lipophilic groups in the molecule, and Hl is the respective HLB value of the lipophilic groups. The HLB model can be used for applications including emulsification, detergency, solubilization, and other applications. Typically, a HLB value will indicate the emulsifying surfactant properties, where a value of 1 to 3 indicates anti-foaming of aqueous systems, a value of 3 to 7 indicates water in oil emulsification, a value of 7 to 9 indicates wetting, a value of 8 to 28 indicates oil in water emulsification, a value of 11 to 18 indicates solubilization, and a value of 12 to 15 indicates detergency and cleaning. In an embodiment, the emulsifying surfactant used may have an HLB value of about 8 to about 28.

The drilling fluid may further include a filtration control agent. Any suitable filtration control agent capable of managing filtration, including bridging, bonding, deflocculation, and viscosity, may be used. The filtration control agent may also function to reduce filter cake permeability. Suitable filtration control agents may include, but are not limited to, a cellulose derivative, a latex polymer, a copolymer of acrylamido-2-methyl-2-propanesulfonic acid, polyanionic cellulose, polyacrylate, modified lignite, powdered resin, modified starch; carboxymethylcellulose, starch, starch ether derivatives, hydroxyethylcellulose, cross-linked hydroxyethylcellulose, methylstyrene-co-acrylate, a substituted styrene copolymer, any derivative thereof, the like, and/or any combination thereof. The filtration control agent may be present in the drilling fluid in any suitable amount, including but not limited to, an amount ranging from 0.5 lb/bbl (1.4 kg/m$^3$) to about 15 lb/bbl (43 kg/m$^3$) or, more particularly, ranging from about 1 lb/bbl (3 kg/m$^3$) to about 13 lb/bbl (37 kg/m$^3$) or, more particularly, from about 2 lb/bbl (6 kg/m$^3$) to about 12 lb/bbl (34 kg/m$^3$).

The drilling fluid may further include a lost circulation material which may be natural or synthetic, degradable or nondegradable, particles or fibers, and mixtures thereof. Suitable examples of materials for a lost circulation material may include, but are not limited to, sand, shale, ground marble, bauxite, ceramic materials, glass materials, metal pellets, high strength synthetic fibers, cellulose flakes, wood, resins polymer materials (crosslinked or otherwise), polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, composite particulates, and any combination thereof. Suitable composite particulates may include a binder and a filler material, wherein suitable filler materials may include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The lost circulation material may be present in a drilling fluid in any suitable amount, including but not limited to, about 1 wt. % to about 40 wt. % based on total weight of the drilling fluid. Alternatively, the lost circulation material may be present in an amount about 1 wt. % to about 30 wt. % or about 10 wt. % to about 30 wt. % based on total weight of the drilling fluid. For example, the lost circulation material may be present in the drilling fluid in an amount of about 5 wt. %, about 10 wt. %, about 20 wt. %, about 25 wt. %, or about 30 wt. %, based on a total weight of the drilling fluid. Furthermore, different sizes of lost circulation materials may be used. For example, the lost circulation material may include two, three, of four lost circulation materials of different sizes. By way of example, the lost circulation materials may include particles with a size distribution ranging from about 2 μm to about 1,500 μm. For example, the lost circulation material may have a particle size distribution of about 5 μm, or about 25 μm, or about 50 μm, or about 100 μm, or about 400 μm, or about 600 μm, or about 1,000 μm.

The drilling fluid may further include a shale inhibitor which may be used to slow the hydration, swelling and disintegration of shales. Examples of suitable shale inhibitors may include, but are not limited to, amines, glycols, polyacrylamides, partially hydrolyzed polyacrylamides, polyvinylpyrrolidones, polyvinylalcohols, and or any combination thereof. The shale inhibitor may be present in a drilling fluid in an any suitable amount, including an amount ranging from about 0.1 wt. % to about 5 wt. % based on a total weight of the drilling fluid, including, but not limited to about 0.1 wt. %, about 1 wt. %, about 2 wt. %, about 3 wt. %, about 4 wt. %, or about 5 wt. %.

The drilling fluid may further include a lubricant. A lubricant may be used to lower torque (rotary friction) and drag (axial friction) in the wellbore as well as lubricate bit bearings if they are not sealed. Examples of suitable lubricants may include, but are not limited to vegetable oils, olefins, phosphonates, esters, glycols, glass beads, and or any combination thereof. The lubricant may be present in a drilling fluid in an any suitable amount, including an amount ranging from about 1 wt. % to about 10 wt. % based on a total weight of the drilling fluid. Alternatively, the lubricant may be present in a drilling fluid in an amount ranging from about 1 wt. % to about 4 wt. % or from about 5 wt. % to about 8 wt. % based on a total weight of the drilling fluid.

The drilling fluid may further include a solid bridging agent. Bridging agents typically include sized solid particulate capable of forming a bridge across the pore throat or fractures of an exposed rock thereby building a filter cake which may aid in preventing loss of whole mud or excessive filtrate may be used. Solid bridging agent may include, without limitation, particulates are soluble, particularly acid-soluble. Examples of suitable solid bridging agents may include, but are not limited to, calcium carbonate, salt particulates, iron carbonate, zinc carbonate, polylactic acid, wax particulates, magnesium carbonate, magnesium oxide, manganese tetraoxide, and combinations thereof. The solid bridging agent may include any particle size distribution as desired for a particular application. In certain embodiments, the solid bridging agent may have a mean particle size in a range of from about 1 micron to about 200 microns as defined by ASTM methods. The mean particle size corresponds to d50 values as measured by particle size analyzers such as those manufactured by Malvern Instruments, Worcestershire, United Kingdom. In specific embodiments, the sized solids may have a mean particle size in a range of from about 1 micron to about 200 microns, from about 5 microns to about 100 microns, or from about 10 microns to about 50 microns. With hydraulic shear in the drill-in fluid, as experienced when the fluid exits the jets in the drill bit under pressure, the solid bridging agent may be finely dispersed into the colloidal or sub-micron size range. The solid bridging agent may be present in any suitable amount for a particular application. For example, the solid bridging agent may be present in the drill-in fluid in an amount in a range of about 1 wt. % to about 50 wt. % based on a total weight of the drill-in fluid. Alternatively, they may be present in an amount of about 1 wt. % to about 10 wt. % by weight, about 10 wt. % to about 20 wt. % by weight, about 20 wt. % to about 30 wt. % by weight, about 30 wt. % to about 40 wt. % by weight, or about 40 wt. % to about 50 wt. % based on a total weight of the drilling fluid.

The drilling fluid may further include a weighting agent. Weighting agents are typically solid particulates with a high specific gravity (e.g., greater than 2) that are capable of increasing the fluid density to thereby affect the hydrostatic pressure exerted by the drill-in fluid. In an embodiment, the weighting agent may be a dissolvable weight agent, an acid-soluble weighting agent, the like, and/or any combination thereof. Suitable weighting agents may include, but are not limited to, calcium carbonate, coated calcium carbonate (i.e., calcium carbonate coated with steric acid), manganese carbonate, manganese tetraoxide, limonite zinc carbonate, hematite, potassium chloride, sodium chloride, sodium bromide, calcium chloride, calcium bromide, ammonium chloride, zinc bromide, zinc formate, zinc oxide, barium sulfate, lead (II) sulfide, an acid soluble material, ultra-fine grind barite, micronized barite, the like, and/or any combination thereof. In some embodiments, manganese tetraoxide may be used as the weighting agent, either alone or with one or more addition weighting agents. When used with the polyol, the polyol may advantageously function as a wetting agent, thus increasing dispersability of the manganese tetraoxide. Without being limited by theory, it is believed this wetting may be due the reduction in interfacial tension that minimizes van der Waals attraction of particles, reducing aggregation of particles in the drill-in fluid. The weighting agent may be included in the drill-in fluid an amount suitable to provide a desired target density and, thus, the particular amount of the weighting agent included will vary based on a number of factors, including the particular weight agent (or agents) chosen. Suitable weights agents may be used in an amount ranging from 0.1 lb/bbl (0.3 kg/m$^3$) to about 600 lb/bbl (1710 kg/m$^3$) and, more particularly, ranging from about 10 lb/bbl (29 kg/m$^3$) to about 400 lb/bbl (1140 kg/m$^3$).

The FIGURE illustrates an example drilling assembly 100 in in accordance with certain embodiments. It should be noted that while FIG. 1 generally depicts a land-based drilling assembly, the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118.

A pump 120 (e.g., a mud pump) may circulate a drilling fluid, shown in the FIGURE as drilling fluid 122, through a feed pipe 124 and to the kelly 110, which conveys the drilling fluid 122 downhole through the interior of the drill string 108 and through one or more orifices in the drill bit 114. The drilling fluid may be formulated as described above, for example, with a reclaimed carbon black additive. The drilling fluid 122 may then be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a screening device (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drilling fluid 122 may be deposited into a nearby retention pit 132 (i.e., a mud pit) for future reuse. While illustrated as being arranged at the outlet of the wellbore 116 via the annulus 126, the fluid processing unit(s) 128 may be arranged at any other location in the drilling assembly 100 to facilitate its proper function, without departing from the scope of the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 1 shows only a single retention pit 132, there could be more than one retention pit 132, such as multiple retention pits 132 in series. Moreover, the retention put 132 may be representative of one or more fluid storage facilities and/or units where the drilling fluid additives may be stored, reconditioned, and/or regulated until added to the drilling fluid 122.

Accordingly, this disclosure describes methods, systems, and apparatuses that use a drilling fluid comprising reclaimed carbon black. The methods, systems, and apparatuses may include any of the following statements:

Statement 1. A method comprising: circulating a drilling fluid in a wellbore, wherein the drilling fluid comprises: an aqueous phase; and a reclaimed carbon black additive; and drilling into a subterranean formation to extend the wellbore while the drilling fluid is circulated therein.

Statement 2. The method of statement 1, wherein the reclaimed carbon black additive is produced from pyrolysis of tires.

Statement 3. The method of any of statements 1-2, wherein the reclaimed carbon black additive comprises about 15-20% ash by weight of the reclaimed carbon black additive, about 0-3% volatile hydrocarbons by weight of the reclaimed carbon black additive, about 3-22% amorphous carbon residue by weight of the reclaimed carbon black additive, and a remainder paracrystalline carbon.

Statement 4. The method of any of statements 1-3, wherein the reclaimed carbon black additive is present in an amount of about 0.1 ppb (pounds per barrel) to about 10 ppb of the drilling fluid.

Statement 5. The method of any of statements 1-4, wherein the drilling fluid comprises an invert emulsion.

Statement 6. The method of any of statements 1-5, wherein the drilling fluid comprises a direct emulsion.

Statement 7. The method of any of statements 1-6, wherein aqueous phase comprises at least one selected from the group consisting of freshwater, seawater, brines containing organic dissolved salts, brines containing group I and/or group II salts, and combinations thereof.

Statement 8. The method of any of statements 1-7, wherein the drilling fluid further comprises an oleaginous phase selected from the group consisting of a fractional distillate of crude oil, a fatty derivative of an acid, an ester, an ether, an alcohol, an amine, an amide, or an imide, a saturated hydrocarbon, an unsaturated hydrocarbon, a branched hydrocarbon, a cyclic hydrocarbon, and any combination thereof.

Statement 9. The method of any of statements 1-8, wherein the drilling fluid has a measured rheology at 3 RPM in a range of from about of between about 5 ($s^{-1}$) to about 20 ($s^{-1}$).

Statement 10. method of any of statements 1-9, wherein the drilling fluid has a measured rheology at 6 RPM in a range of from about of between about 5 ($s^{-1}$) to about 25 ($s^{-1}$).

Statement 11. The method of any of statements 1-10, wherein the drilling fluid has a measured 10-second gel strength in a range of from about 3 lb/100 ft$^2$ to about 20 lb/100 ft$^2$.

Statement 12. The method of any of statements 1-11, wherein the drilling fluid has a measured 10-minute gel strength in a range of from about 3 lb/100 ft$^2$ to about 50 lb/100 ft$^2$.

Statement 13. The method of any of statements 1-12, wherein the drilling fluid has a measured yield point in a range of from about 2 lb/100 ft$^2$ to about 65 lb/100 ft$^2$.

Statement 14. A system comprising: a drilling fluid comprising: an aqueous phase; and a reclaimed carbon black additive; a drilling assembly; a drill string coupled to the drilling assembly; a pumping system fluidically coupled to the drill string, wherein the pumping system is capable of pumping the drilling fluid through the drill string.

Statement 15. The system of statement 14, wherein the reclaimed carbon black additive comprises about 15-20% ash by weight of the reclaimed carbon black additive, about 0-3% volatile hydrocarbons by weight of the reclaimed carbon black additive, about 3-22% amorphous carbon residue by weight of the reclaimed carbon black additive, and a remainder paracrystalline carbon.

Statement 16. The system of any of statements 14-15, the reclaimed carbon black additive is present in an amount of about 0.1 ppb (pounds per barrel) to about 10 ppb.

Statement 17. The system of any of statements 14-16, wherein the drilling fluid has a measured rheology at 3 RPM in a range of from about of between about 5 ($s^{-1}$) to about 20 ($s^{-1}$).

Statement 18. The system of any of statements 14-17, wherein the drilling fluid has a measured rheology at 6 RPM in a range of from about of between about 5 ($s^{-1}$) to about 25 ($s^{-1}$).

Statement 19. The system of any of statements 14-18, wherein the drilling fluid has a measured 10-second gel strength in a range of from about 3 lb/100 ft$^2$ to about 20 lb/100 ft$^2$.

Statement 20. The system of any of statements 14-19, wherein the drilling fluid has a measured 10-minute gel strength in a range of from about 3 lb/100 ft$^2$ to about 50 lb/100 ft$^2$.

To facilitate a better understanding of the present invention, the following examples of certain aspects of some embodiments are given. In no way should the following examples be read to limit, or define, the entire scope of the disclosure.

Example 1

Two water-based drilling fluids were prepared according to Table 1 with a control fluid containing no carbon additive and a test fluid containing 5 ppb (pounds per barrel) (14.26 g/L) of the carbon additive. Xanthan gum was used as a viscosifier and cellulosic polymer as a fluid loss control agent. The fluids were mixed to 12 ppg (pounds per gallon) (1.438 kg/L). After preparing the fluids, each fluid was hot rolled for 16 hours at 250° F. (121° C.). After hot rolling the rheology data was collected including low-end rheology of 3 and 6 RPM in Table 2 and Table 3. It was observed that control fluid without carbon additive had lower rheology including at low-end rheology than the test fluid with carbon additive with favorable yield point. The gels also improved and were found to be non-progressive and fluid loss was reduced.

TABLE 1

| Materials | Control Fluid | Test Fluid |
| --- | --- | --- |
| KCl, ppb (g/L) | 49.46 (141.1) | 49.46 (141.1) |
| Water, ppb (g/L) | 277.11 (790.6) | 277.11 (790.6) |
| Caustic, ppb (g/L) | 0.35 (1.0) | 0.35 (1.0) |
| Xanthan Gum, ppb (g/L) | 1.5 (4.3) | 0.5 (4.3) |
| Cellulosic Polymer, ppb (g/L) | 2 (5.7) | 2 (5.7) |
| Carbon Additive, ppb (g/L) | 0 | 5 (14.3) |
| Barite, ppb (g/L) | 159.66 (455.5) | 159.66 (455.5) |

TABLE 2

| RPM | Control Fluid | Test Fluid |
| --- | --- | --- |
| 600 | 33 | 62 |
| 300 | 22 | 44 |
| 200 | 16 | 37 |
| 100 | 11 | 28 |
| 6 | 2 | 9 |
| 3 | 1 | 7 |

TABLE 3

| | Control Fluid | Test Fluid |
| --- | --- | --- |
| Plastic Viscosity | 11 | 18 |
| Yield Point | 11 | 26 |
| 10 Sec gel, lb/100 sq. ft. | 2 | 8 |

TABLE 3-continued

|  | Control Fluid | Test Fluid |
|---|---|---|
| 10 Min gel, lb/100 sq. ft. | 2 | 8 |
| API Filtrate (ml) | 12 | 10 |

Example 2

Two oil-based drilling fluids (invert emulsion drilling fluids) were prepared according to Table 4 with a control fluid containing no carbon additive and a test fluid containing 5 ppb (pounds per barrel) (14.26 g/L) of the carbon additive. The base oil was a C9-C24 paraffin oil. The primary emulsifier was a fatty acid tall-oil reaction product with diethylenetriamine, maleic anhydride, tetraethylenepentamine, and triethylenetetramine. The fluids were mixed to 12 ppg (pounds per gallon) (1.438 kg/L) and a 70:30 oil to water ratio. After preparing the fluids, each fluid was hot rolled for 16 hours at 250° F. (121° C.). After hot rolling the rheology data was collected including low-end rheology of 3 and 6 RPM in Table 5 and Table 6. It was observed that the overall rheology of the control fluid without carbon additive showed improvement in the test fluid with carbon additive with the API filtrate of the latter showing significant improvement.

TABLE 4

|  | Control Fluid | Test Fluid |
|---|---|---|
| Base Oil, ppb (g/L) | 144.53 (412.3) | 144.53 (412.3) |
| Emulsifier, ppb (g/L) | 12 (34.2) | 12 (34.2) |
| Lime, ppb (g/L) | 4 (11.4) | 4 (11.4) |
| Fluid Loss Additive, ppb (g/L) | 3 (8.6) | 3 (8.6) |
| Brine (CaCl2 + H2O), ppb (g/L) | 29.6 g CaCl2 + 85.25 g H2O | 29.6 g CaCl2 + 85.25 g H2O |
| Organophilic Clay, ppb (g/L) | 4 (11.4) | 4 (11.4) |
| Barite, ppb (g/L) | 221.53 (632.0) | 221.53 (632.0) |
| Rheology Modifier, ppb (g/L) | 0.5 (1.4) | 0.5 (1.4) |
| Carbon additive, ppb (g/L) | 0 | 5 (14.3) |

TABLE 5

| RPM | Control Fluid | Test Fluid |
|---|---|---|
| 600 | 80 | 86 |
| 300 | 49 | 52 |
| 200 | 36 | 39 |
| 100 | 24 | 26 |
| 6 | 11 | 12 |
| 3 | 10 | 11 |

TABLE 6

|  | Control Fluid | Test Fluid |
|---|---|---|
| Plastic Viscosity | 31 | 34 |
| Yield Point | 18 | 18 |
| 10 Sec gel, lb/100 sq. ft. | 12 | 12 |
| 10 Min gel, lb/100 sq. ft. | 17 | 18 |
| ES (V) | 458 | 446 |
| API Filtrate (ml) | 1.0 | 0.2 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method comprising:
   circulating a drilling fluid in a wellbore, wherein the drilling fluid comprises:
   an aqueous phase; and
   a reclaimed carbon black additive, wherein the reclaimed carbon black additive comprises about 15-20% ash by weight of the reclaimed carbon black additive, about 0-3% volatile hydrocarbons by weight of the reclaimed carbon black additive, about 3-22% amorphous carbon residue by weight of the reclaimed carbon black additive, and a remainder paracrystalline carbon; and
   drilling into a subterranean formation to extend the wellbore while the drilling fluid is circulated therein, wherein the drilling fluid has a measured rheology at 3 RPM in a range of from about of between about 5 ($s^{-1}$) to about 20 ($s^{-1}$).

2. The method of claim 1, wherein the reclaimed carbon black additive is produced from pyrolysis of tires.

3. The method of claim 1, wherein the reclaimed carbon black additive is present in an amount of about 0.1 ppb (pounds per barrel) to about 10 ppb of the drilling fluid.

4. The method of claim 1, wherein the drilling fluid comprises an invert emulsion.

5. The method of claim 1, wherein the drilling fluid comprises a direct emulsion.

6. The method of claim 1, wherein aqueous phase comprises at least one selected from the group consisting of freshwater, seawater, brines containing organic dissolved salts, brines containing group I and/or group II salts, and combinations thereof.

7. The method of claim 1, wherein the drilling fluid further comprises an oleaginous phase selected from the group consisting of a fractional distillate of crude oil, a fatty derivative of an acid, an ester, an ether, an alcohol, an amine, an amide, or an imide, a saturated hydrocarbon, an unsaturated hydrocarbon, a branched hydrocarbon, a cyclic hydrocarbon, and any combination thereof.

8. The method of claim 1, wherein the drilling fluid has a measured rheology at 6 RPM in a range of from about of between about 5 $(s^{-1})$ to about 25 $(s^{-1})$.

9. The method of claim 1, wherein the drilling fluid has a measured 10-second gel strength in a range of from about 3 lb/100 ft$^2$ to about 20 lb/100 ft$^2$.

10. The method of claim 1, wherein the drilling fluid has a measured 10-minute gel strength in a range of from about 3 lb/100 ft$^2$ to about 50 lb/100 ft$^2$.

11. The method of claim 1, wherein the drilling fluid has a measured yield point in a range of from about 2 lb/100 ft$^2$ to about 65 lb/100 ft$^2$.

* * * * *